US009641487B2

(12) United States Patent
Zhou et al.

(10) Patent No.: US 9,641,487 B2
(45) Date of Patent: May 2, 2017

(54) METHOD, SYSTEM AND APPARATUS FOR SHARING MEDIA CONTENT IN A PRIVATE NETWORK

(75) Inventors: Yu Chen Zhou, Beijing (CN); Lin Ma, Beijing (CN); Lei Ma, Beijing (CN); Yi Min Gan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1411 days.

(21) Appl. No.: 11/722,003

(22) PCT Filed: Dec. 20, 2005

(86) PCT No.: PCT/EP2005/056966
§ 371 (c)(1),
(2), (4) Date: Jan. 7, 2009

(87) PCT Pub. No.: WO2006/069939
PCT Pub. Date: Jul. 6, 2006

(65) Prior Publication Data
US 2009/0129587 A1 May 21, 2009

(30) Foreign Application Priority Data
Dec. 29, 2004 (CN) .......................... 2004 1 01029959

(51) Int. Cl.
*H04N 21/4408* (2011.01)
*H04L 29/06* (2006.01)
(Continued)

(52) U.S. Cl.
CPC ......... *H04L 63/0428* (2013.01); *H04N 7/162* (2013.01); *H04N 7/1675* (2013.01);
(Continued)

(58) Field of Classification Search
CPC ........... H04N 21/4405; H04N 21/4408; H04N 63/065
(Continued)

(56) References Cited

U.S. PATENT DOCUMENTS 6,240,514 B1 * 5/2001 Inoue .................. H04L 63/0464
380/248
7,639,805 B2 * 12/2009 Li et al. ........................ 380/201
(Continued)

FOREIGN PATENT DOCUMENTS

EP 1359758 A1 11/2003
JP 2002-330126 11/2002
(Continued)

OTHER PUBLICATIONS

IBM Response to DVB-CPT CAII for Proposals for Content Protection & Copy Management: xCP Cluster Protocol, Oct. 19, 2001.*
(Continued)

Primary Examiner — Ellen Tran
(74) Attorney, Agent, or Firm — Steven L. Nichols; Fabian VanCott (57) ABSTRACT

A method, system and apparatus for sharing media content securely and reliably among various computing devices in a private network through media streaming technology is provided. According to the invention, a media streaming apparatus is installed on each computing device, said media streaming apparatus comprises: a controller for controlling a media streaming proxy and a trusted media player to render the requested media stream according to a user's request or the request coming from other application component; the trusted media player for securely rendering the requested media stream for the user under the control of said controller; the media streaming proxy for communicating with the trusted media player and other remote media streaming (Continued)

proxies in said private network, forwarding encrypted media stream, controlling encryption/decryption module to encrypt/decrypt the media player and providing the decrypted media stream to the trusted media player; and the encryption/decryption module for encrypting/decrypting the media stream under the control of the media streaming proxy.

20 Claims, 7 Drawing Sheets

(51) Int. Cl.
    H04N 7/16       (2011.01)
    H04N 7/167      (2011.01)
    H04N 21/41      (2011.01)
    H04N 21/432     (2011.01)
    H04N 21/436     (2011.01)
    H04N 21/4405    (2011.01)

(52) U.S. Cl.
    CPC ..... *H04N 21/4113* (2013.01); *H04N 21/4126* (2013.01); *H04N 21/4135* (2013.01); *H04N 21/4325* (2013.01); *H04N 21/43615* (2013.01); *H04N 21/4405* (2013.01); *H04N 21/4408* (2013.01); *H04L 63/065* (2013.01)

(58) Field of Classification Search
    USPC .......................... 380/42, 277, 200; 726/2–21; 713/150–181; 709/219
    See application file for complete search history.

(56) References Cited

U.S. PATENT DOCUMENTS

| | | | | |
|---|---|---|---|---|
| 2002/0194209 | A1* | 12/2002 | Bolosky et al. | 707/205 |
| 2003/0097483 | A1* | 5/2003 | Owerfeldt | 709/312 |
| 2003/0182429 | A1* | 9/2003 | Jagels | 709/227 |
| 2003/0204602 | A1* | 10/2003 | Hudson | D01D 5/423 709/228 |
| 2004/0107356 | A1 | 6/2004 | Shamoon et al. | |
| 2004/0139027 | A1 | 7/2004 | Molaro | |
| 2005/0010963 | A1* | 1/2005 | Zeng et al. | 725/131 |
| 2005/0172127 | A1* | 8/2005 | Hartung et al. | 713/167 |
| 2008/0263634 | A1* | 10/2008 | Kirkland | 726/3 |
| 2008/0282083 | A1* | 11/2008 | Risan et al. | 713/153 |

FOREIGN PATENT DOCUMENTS

| | | |
|---|---|---|
| JP | 2003-218852 | 7/2003 |
| JP | 2003-308268 A | 10/2003 |
| JP | 2004-135105 A | 4/2004 |
| JP | 2005-518769 A | 6/2005 |
| WO | 03058485 | 7/2003 |
| WO | 03073760 A1 | 9/2003 |
| WO | 2004002112 A1 | 12/2003 |

OTHER PUBLICATIONS

Fengming Huang et al., "Watermarking of Streaming Video for Finger-Printing Applications", 2002 IEEE Int. Symposium on Circuits and Systems. Proceedings. Part II, vol. 2, p. II-452-II-455—vol. 2.

Vorbruggen et al., "Digital Watermarking for Secure and Adaptive Teleconferencing", Proceedings of the SPIE, vol. 4675, pp. 542-547, 2002.

DeCarmo, L. "HDTV and Broadcast Flags", Dr. Dobb's Journal, vol. 28, No. 11, pp. 42-46, Nov. 1, 2003.

Eskicioglu et al., An Overview of Multimedia Content Protection in Consumer Electronics Devices, Signal Processing: Image Communication (Journal Paper), vol. 16, No. 7, pp. 681-699, 2001.

Portmann et al., "Selective Security for TLS", Proceedings of the Ninth IEEE International Conference on Networks (ICON 2001), pp. 216-221.

Bertram, Reinhard, "Multimedia in Secure Network Topologies", Proceedings of the Spie (Int. Soc. Opt. Eng.), pp. 187-288, Jan. 2000.

ISMA (Internet Streaming Media Alliance), Internet Streaming Media Alliance—Implementation Specification, ISMA Encryption and Authentication, Version 1.1, AREA/Task Force: DRM, Sep. 15, 2006.

* cited by examiner

METHOD, SYSTEM AND APPARATUS FOR SHARING MEDIA CONTENT IN A PRIVATE NETWORK

TECHNICAL FIELD OF THE INVENTION

The present invention relates to technology for distributing media content, and in particular, to technology for sharing media content securely and reliably among various computing devices in a private network via media streaming technology.

BACKGROUND OF THE INVENTION

In recent years, with the emergence of various new types of multimedia electronic products, and with the development of broadband data connections and wired and wireless connection technology for use in a private network, more and more people are connecting their own computing devices together via a private network (for example, a home network) so as to share various resources. For example, people want to be able to share the media content (e.g. movies, music etc.) on various computing devices via their home networks. Meanwhile, to attract more customers, a number of media content providers have removed the binding between media content and specific rendering devices, thereby extending the rendering range of the media content to an authorized domain. This is implemented by substituting the offline and one way authentication-based broadcast encryption method for the traditional online and two way authentication-based public key infrastructure (PKI) method.

For example, when employing the broadcast encryption method to protect the media content on a physical media, each media has a data block thereon referred to as a key management block (KMB), while each trusted computing device (e.g. a trusted media player), for rendering the media content on a physical media, will first read the KMB and generate a key for reading the media content on the physical media by processing the KMB. That key is referred to as a management key. The computing device that can generate the correct management key can render the media content on the physical media. Thus, the binding between media content and a specific rendering device is removed through the broadcast encryption, thereby extending the rendering range of the media content to a set of computing devices which can generate the correct management key by processing the KMB on the media. Such a set of computing devices constitute an authorized domain. Within the authorized domain, each trusted computing device could share the media content equally or peer-to-peer, that is: the media content can flow from any one of the computing devices to another computing device. Although this provides legality for the sharing of media content in a private network, there still are many technical problems to be resolved.

First, various computing devices on a private network, such as PC, set-top box, FDA and mobile phone etc., have different system capabilities and media features. Most low-end computing devices such as set-top hoses, PDAs and mobile phones etc. do not have enough storage, for storing large media file in local storage, and need media streaming technology to render the media content that resides on larger computing devices, such as PC and home media server. And also, by relying on media streaming technology, it is possible to implement peer-to-peer media content sharing among various low-end computing devices.

At present, many standard organizations have defined a variety of secure media streaming solutions, but they all have limitations and could not be used in sharing media content in a private network. For example, Internet Media Streaming Alliance (ISMA) has presented an ISMA 1.0 implementation specification to promote the existing IETF and MPEG standards for broadcasting via Internet. It is said that the publication of the specification is helpful to generate a complete, open and peer-to-peer multimedia streaming solution used in an IP network. In that specification, ISMA has defined two layers. First, layer 0 focuses on rendering audio/video content to low-complexity devices via wireless and narrowband networks, low-complexity devices including devices such as cell phones and PDAs which limit the viewing and listening performance. Next, layer 1 focuses on rendering content via a network, that has broadband-like quality so as to provide more abundant viewing experience for end users. Layer 1 is oriented to devices with more powerful functions, such as set-top boxes and PCs. ISMA 1.0 employs MPEG-4 compression standard and has precisely defined some features of the MPEG-4 standard to ensure interoperability between the entire rendering flow, while these features are necessary to server, client and intermediate part. Also, ISMA 1.0 has defined the features and selected formats of the RTP, RTSP and SDP standards that have to be implemented. Thus it can be seen that ISMA 1.0 is a new media streaming specification, proposed as a standard for Internet streaming infrastructure. It could not be deployed on existing private networks that use a diversity of transport protocols and media formats.

In addition, the present media streaming technology all works in client/server mode, hence a powerful media streaming server is needed.

This kind of working mode is not suitable for sharing media content in a private network. The sharing of media content in a private network should employ a peer-to-peer working mode to ensure that the media content can flow from any computing device to any other computing device in the private network. Also, the typical computing device in a private network only has limited system resources and could not act as a media streaming server.

To share media content in a private network, another problem to be solved is how to implement a media streaming solution that is independent of media format, so that each computing device on the private network can share the media content. For example, Windows, Apple QuickTime and Realnetwork media streaming solutions all support a restricted number of media formats. Thus, the problem of sharing media content peer-to-peer in a private network could not be solved by installing the above server and client program on all the computing devices in the private network simultaneously. Also adaptation issues for other customized private formats and new schemes that may appear in the future will exist.

SUMMARY OF THE INVENTION

The invention ensures that media stream will flow securely and reliably among various computing devices and will not be accessed illegally. In addition, the technology for sharing media content according to the invention supports a peer-to-peer scalable architecture and is independent of media format and content provider's media streaming scheme.

The following detailed description of the invention taken in conjunction with the accompanying drawings will help to understand the invention more comprehensively and make the features and advantages of the invention more apparent.

BRIEF DESCRIPTION OF THE DRAWINGS

FIG. 1, consisting of FIGS. 1A and 1B, shows the basic working principle of the existing media streaming scheme;

DETAILED DESCRIPTION OF THE PREFERRED EMBODIMENTS

To better understand the invention, before describing the preferred embodiments of the invention in conjunction with accompanying drawings, first the basic working principle of the existing media streaming scheme will be described in conjunction with FIG. 1. It has been noted that various computing devices on a private network, such as PC, set-top box, PDA and mobile phone etc., have different system capabilities and media features. Most of low-end computing devices do not have enough storage for storing large media, file in local storage, and need media streaming technology to render the media content that resides on larger computing devices, such as PC and home media server. And also, by relying on media streaming technology, it is possible to implement peer-to-peer media content sharing among various low-end computing devices.

Media, stream refers to the continuous time base media that uses streaming technology in the internet/intranet, for example, audio, video or multimedia files. Media streaming technology does not download the entire file before rendering, but only loads a beginning portion of the content into memory. The media stream is transmitted progressively as it is rendered with just some delay at the beginning. The key technology to obtain media stream is streaming. The definition for streaming is very wide, now it mainly refers to the collective name of the technology that transfers media (such as video, audio) via network. Its specific implication is to transfers movie and television program to PC via Internet. There are two methods to implement streaming: progressive streaming and real-time streaming. FIG. 1 shows the basic working principle of these two kinds of streaming schemes.

Figure 1A:
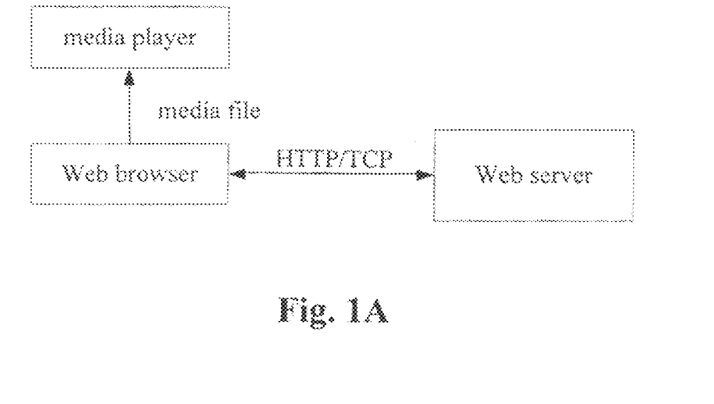
Figure 1B:
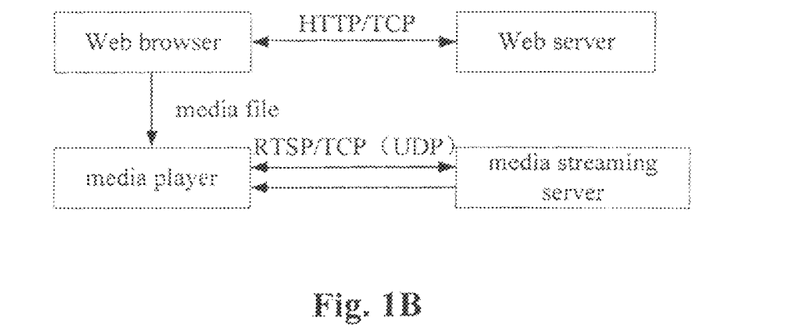
Figure 2:
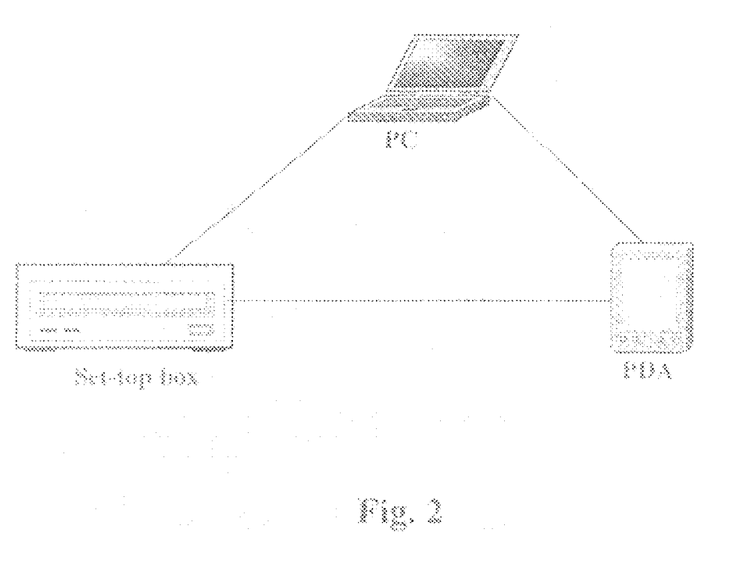
FIG. 2 is a schematic diagram of a home network.

As shown in FIG. 1A and FIG. 1B, in the progressive streaming technology, a standard Web server transmits media content progressively to a user's media player for rendering according to the Web browser's request. Because the standard Web server complies with HTTP (Hypertext Transfer Protocol), this kind of progressive streaming technology is also referred to as HTTP media streaming technology. In real-time streaming technology, after the Web server and the Web browser have exchanged control information and established connection via HTTP/TCP, real-time media stream, is transferred between the media streaming server and the media player using RTSP/UDP protocols. In the real-time streaming technology, generally a dedicated server and a player are needed. In the existing media streaming scheme, whether progressive streaming or real-time streaming, both of which employ a client/server working mode, a media file is stored on the server in an unencrypted form. When a client requests a media file, the server encrypts the media file in real time according to the properties of the client's media player and then transmits it to the client. While in a private network (such as the illustrative home network shown in FIG. 2), what is required is a peer-to-peer scalable architecture. That is: any of the two computing devices in the private network can transfer media content to each other, and often there will be new computing devices added into the home network. So, the existing media streaming scheme is not suitable for sharing media content in a private network.

To provide a peer-to-peer scalable architecture, in the present invention, each computing device in the private network has installed thereon the same media streaming apparatus, and in order to alleviate the workload due to real time encryption, the media file is distributed on various computing devices in an encrypted forms.

Figure 3:
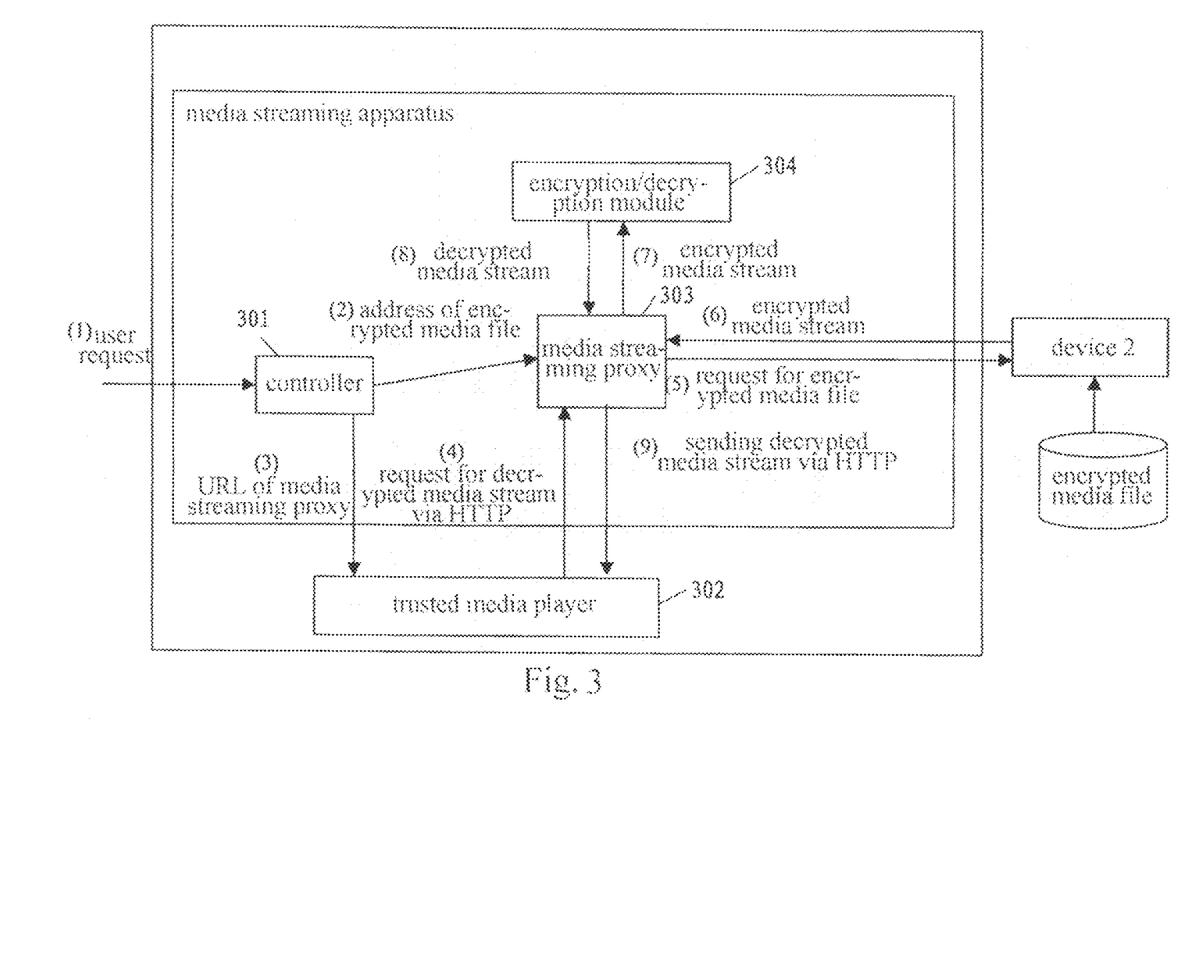
FIG. 3 shows a block diagram of a media streaming apparatus for sharing media content in a private network according to one preferred embodiment of the invention.

FIG. 3 shows a block diagram of a media streaming apparatus for sharing media content in a private network according to one preferred embodiment of the invention, wherein the media content is encrypted in broadcast encryption manner and distributed to multiple computing devices. As shown in FIG. 3, the media streaming apparatus comprises: a controller 301 for controlling a local media streaming proxy and a trusted media player to render the requested media stream according to a user's request or the request coming from other application component; the trusted media player 302 for securely rendering the requested media stream for the user under the control of said controller, the media streaming proxy 303 for communicating with other remote media streaming proxies in said private network, forwarding encrypted media stream, controlling encryption/decryption module to encrypt/decrypt the media stream and providing the decrypted media stream to the local trusted media player, and the encryption/decryption module 304 for encrypting/decrypting the media stream under the control of the media streaming proxy. Each computing device in the home network shown in FIG. 2 has installed thereon such a media streaming apparatus.

Next, the workings of the media streaming apparatus according to the invention will be described in detail with reference to FIG. 3. As shown in FIG. 3, when a user of a certain computing device (device 1) on the home network sends a request that he/she wants to view the media content on another computing device (device 2), the controller 301 in the media streaming apparatus on device 1 receives that request, then passes the address of the media file to the media streaming proxy 303 and the URL (Uniform Resource Locator) of the local (on device 1) media streaming proxy to the trusted media player 302. The media player 302 sends a HTTP request to the local media streaming proxy 303. After receiving that request, the media streaming proxy 303 determines that the media file is located on computing device 2 based on the address of the media file received from the controller 301, then requests the media file from the media streaming proxy on device 2. The media streaming proxy on device 2 reads the encrypted media file block by block and sends the file to the media streaming proxy on device 1 block by block. Each time the media streaming proxy on device 1 (local media streaming proxy 303) receives an encrypted media block, it invokes the encryption/decryption module 304 to decrypt the encrypted media block, and sends the decrypted media block to the local media player 302 as a response to its HTTP request. The media player renders the received decrypted media block.

From the above, it can be seen that in the media content sharing scheme according to the invention, each computing device in the private network has installed thereon a media streaming apparatus as shown in FIG. 3. So, for low-end computing devices such as set-top boxes, PDAs and mobile phones etc. that do not have enough storage to store large media file in local storage, by means of the media streaming apparatus installed thereon, the media content can be shared securely and reliably in a private network with the help of the media streaming technology.

In addition, since each media file is distributed on various computing devices in encrypted form and media stream is also transferred in encrypted form over the entire private network, the media stream can flow securely and reliably among various computing devices and will not be accessed illegally.

Also, since in the media content sharing scheme according to the invention, each computing device in the private network has installed thereon a media streaming apparatus as shown in FIG. 3, any of the two computing devices in the private network can transfer media content to each other, and a new computing device can be added into that private network after it has been authorized and authenticated and has installed such a media streaming apparatus. Thus, the media content sharing scheme according to the invention supports a peer-to-peer scalable architecture.

In addition, in the media content sharing scheme according to the invention, the media streaming proxy and the media player request and send media streaming through HTTP request and HTTP response, so it is independent of media format and a content provider's media streaming scheme. Any player that supports HTTP media streaming can be integrated into the system.

Figure 4:
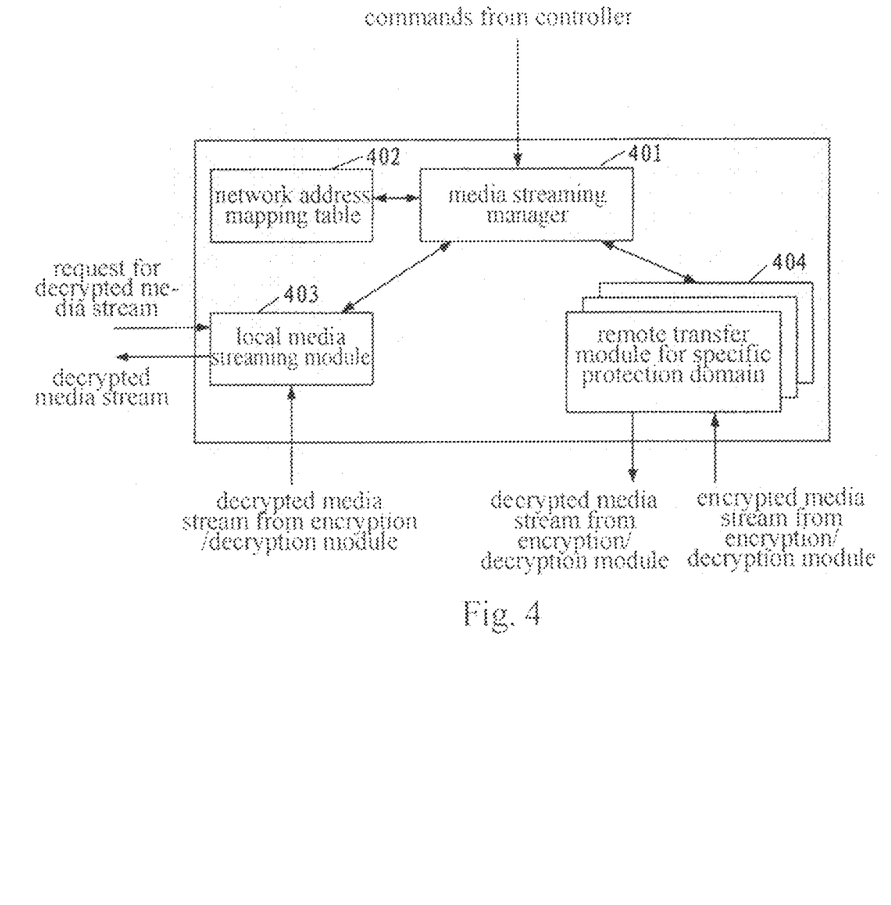
FIG. 4 shows a block diagram of a media streaming proxy in a media streaming apparatus for sharing media content in a private network according to one preferred embodiment of the invention.

To better understand the invention, the media streaming proxy 303 in the media streaming apparatus will be described in detail in the following in conjunction with FIG. 4. FIG. 4 shows a block diagram of a media streaming proxy in a media streaming apparatus for sharing media content in a private network according to one preferred embodiment of the invention. As shown in FIG. 4, the media streaming proxy comprises: a media streaming manager 401 for receiving commands from a local controller, and for interpreting and forwarding requests to stream media stream between a local media player and other remote media streaming proxies in the private network, and a network address mapping table 402 for storing mapping relationship between any of two addresses on said private network. The media streaming manager, based on this mapping relationship, interprets and forwards requests to stream between a local media player and other remote media streaming proxies in said private network. The proxy also includes a local media streaming module 403 for processing requests from local media streaming player, and for providing the decrypted media stream to the local media player, and a remote transfer module 404 for communicating with other remote media streaming proxies in said private network, forwarding encrypted media stream, controlling encryption/decryption module to encrypt/decrypt the media stream. A plurality of remote transfer modules is shown in FIG. 4, which is used for different media content protection domains. It has already been noted that rendering range of the media content can be extended to an authorised domain based on broadcast encryption method, within that authorized domain, each trusted computing device can share the media content. All the computing devices on the entire private network can be regarded as one authorized domain. Again within that authorized domain, for certain purposes (such as to facilitate management), it can be divided into multiple media content protection domains based on user policies. Each computing device in the same media content protection domain will use the same domain key to encrypt/decrypt media content and use the same communication protocol to communicate with each other. On a computing device that belongs to multiple media content protection domains, its media streaming apparatus comprises a plurality of encryption/decryption modules that correspond to each media content protection domain respectively, and its media streaming proxy supports a plurality of communication protocols that correspond to each media content protection domain respectively, so as to forward encrypted media stream among various media content protection domains. Thus, in FIG. 4, the media streaming proxy in the media streaming apparatus for sharing media content in a private network, according to one preferred embodiment of the invention comprises a plurality of remote transfer modules responding to respective media content protection domains.

Figure 5:
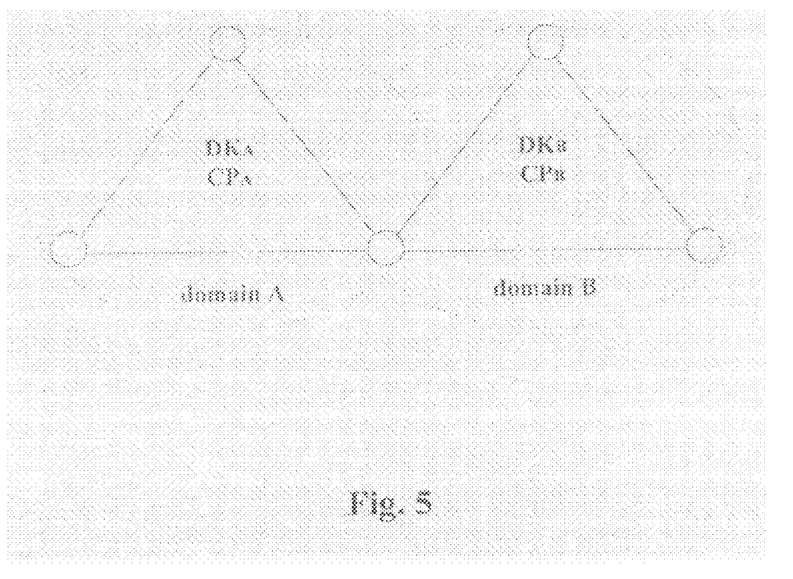
FIG. 5 is a schematic diagram of another home network.

FIG. 5 shows a schematic diagram of a home network that includes two different media content protection domains A and B. Within media content protection domain A, each computing device communicates with each other via communication protocol CPA and all employ the same domain key DKA to encrypt/decrypt the media content. Within media content protection domain B, each computing device communicates with each other via communication protocol CPB and all employ the same domain key DKB to encrypt/decrypt the media content.

Figure 6:
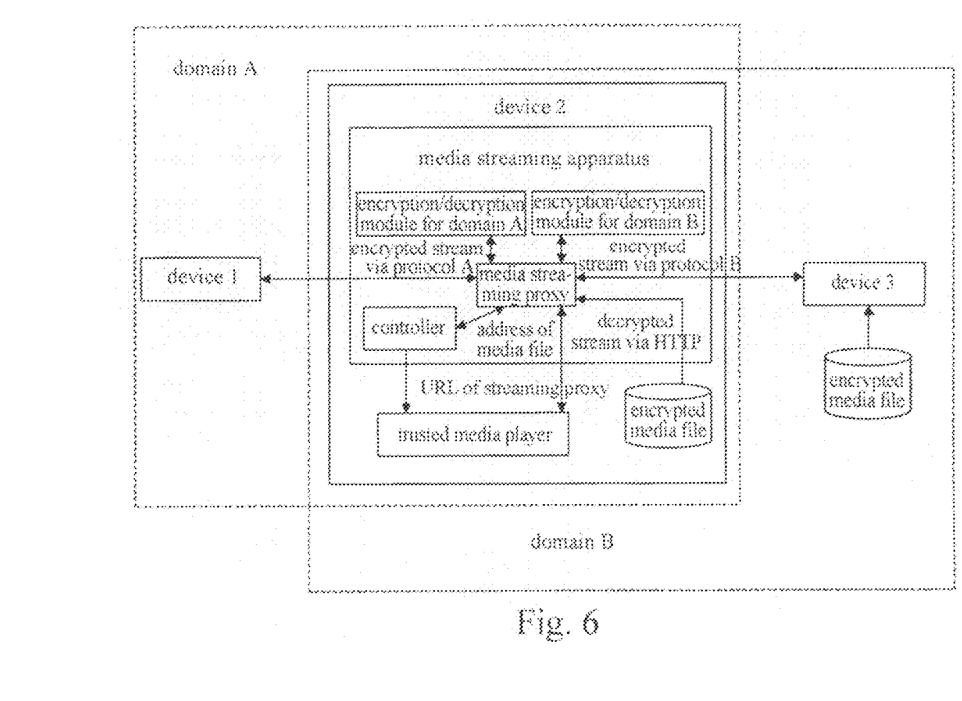
FIG. 6 shows a block diagram of a system for sharing media content in a private network according to one preferred embodiment of the invention.

FIG. 6 shows a block diagram of a system for sharing media content in a private network that has two different media content protection domains A and B according to preferred embodiment of the invention. As shown in FIG. 6, in that embodiment, device 1 belongs to media content protection domain A, device 3 belongs to media content protection domain B, while device 2 belongs to both media content protection domains A and B.

Figure 7:
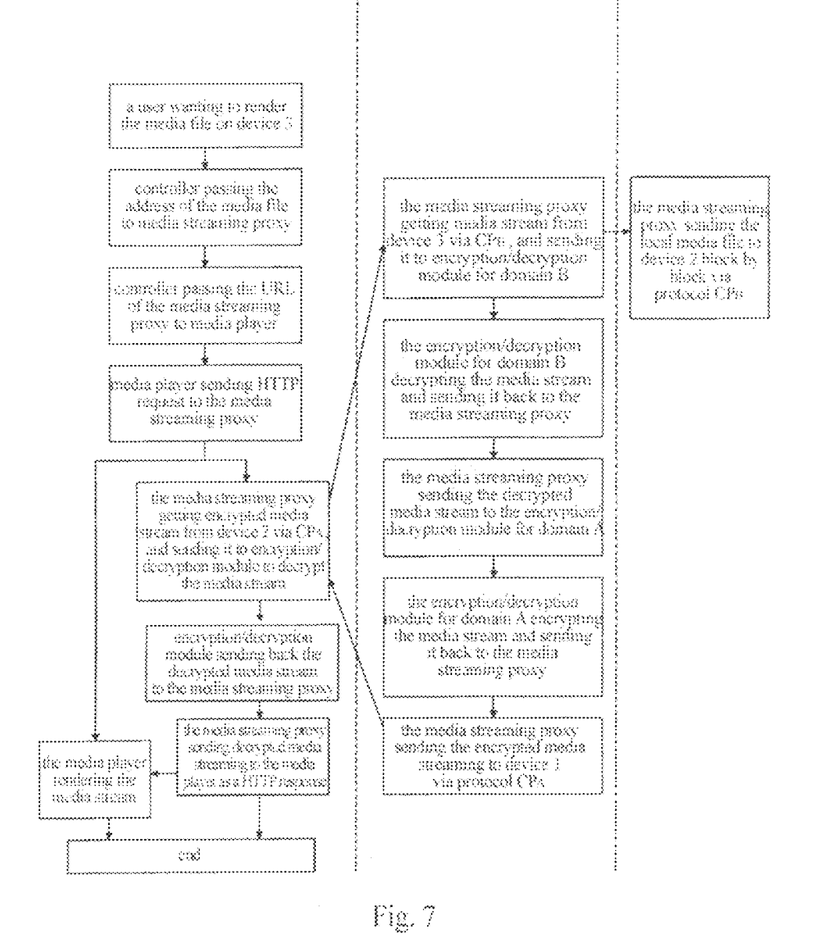
FIG. 7 shows the working flow of the system for sharing media content in a private network shown in FIG. 6.

FIG. 7 shows the working flow of the system for sharing media content in a private network shown in FIG. 6 when the user of device 1 wants to view the media file on device 3. As shown, once the controller in the media streaming apparatus on device 1 receives a request from a user interface or other application component, it passes the address of the media file to media streaming proxy and the URL of the local media streaming proxy to the media player, the media player sends a HTTP request to the local media streaming proxy, and the local media streaming proxy requests encrypted media stream from device 2 via protocol CPA. In particular, it is the media streaming manager in the media streaming proxy that learns from the network address mapping table to send a request to device 2, and invokes the remote transfer module for media content protection domain A to request encrypted media streaming from device 2 via protocol CPA (for brevity, various components of media streaming proxy will not be detailed in the following description). After receiving that request, the media streaming proxy on device 2 requests encrypted media streaming from device 3 via protocol CPB. After the media streaming proxy on device 3 has received that request, it reads the encrypted media content block by block and sends the blocks to the media streaming proxy of device 2 via protocol CPB. After the media streaming proxy of device 2 has received the encrypted media stream, it invokes the encryption/decryption module for media content protection domain B to decrypt the received media stream, then invokes encryption/decryption module for media content protection domain A to encrypt the decrypted media stream, and sends it to the media streaming proxy of device 1 via protocol CPA. After the media streaming proxy of device 1 has received the encrypted media stream, it decrypts the media stream and sends the decrypted media stream as an HTTP response to local media player for rendering to the user.

The invention has been described in detail in conjunction with accompanying drawings in the above. In the above embodiments, taking the case of two different media content protection domains as an example, how to span protection domains to share media content in a private network is described. For those skilled in the art, it is apparent that the invention is also suitable for spanning multiple protection domains to share media content.

From the above description it can be seen that there is substantial difference between the media streaming scheme of the invention and a traditional media streaming scheme. First the traditional media streaming scheme is based on client/server architecture and needs a dedicated media streaming server and communication protocol, while the media streaming scheme according to the invention supports a peer-to-peer scalable architecture and there is no need for dedicated media streaming server and communication protocol. In addition, in the traditional media streaming scheme, there is a need for PKI-based two way authentication between client and server, often through exchanging handshake signal and key, and media file is encrypted in real time by the server based on the properties of the media player on the client, while in the media streaming scheme according to the invention, when a computing device is added into a private network, it is authenticated and assigned to corresponding media content protection domains according to its media content protection mechanism and communication protocol employed, the media file is pre-encrypted with corresponding media content protection mechanism and is distributed on various computing devices.

In some examples, a computer program product for sharing media streams among multiple computing devices in a network may comprise: a computer usable storage medium having computer usable program code embodied therewith, the computer usable program code comprising: computer usable program code configured to receive an encrypted media stream from another of said multiple computing devices; computer usable program code configured to decrypt the received media stream; and computer usable program code configured to forward the decrypted media stream to a media player for rendering.

The present invention has been described in the above according to detailed embodiments, for those ordinary in the art, other and further embodiments of the invention can be revised without departing from the basic scope of the invention, and hence the scope thereof should be defined by the appended claims.

The invention claimed is:

1. A method for sharing secure media content among multiple devices in a private network using media streaming, where at least two computing devices are connected by the private network and a first computing device cannot store an entire media stream, the method comprising:
providing a media streaming apparatus on each computing device, each media streaming apparatus comprising: a controller; an encryption and decryption module; a media streaming proxy; and a trusted media player, wherein the encryption and decryption module in each media streaming apparatus is the same and the media streaming proxy in each media streaming apparatus is the same;
receiving a user request at the first computing device to render a media file on the trusted media player of the first computing device;
receiving a first block of the media file at the second computing device;
decrypting, from a non-network encryption, the first block using the encryption and decryption module on the second computing device;
encrypting, with a network encryption, the first block using the encryption and decryption module on the second computing device;
determining, by the controller of the first computing device, a location of the first block on a second computing device, the controller of the first computing device instructing the media streaming proxy of the first computing device to acquire the block from the media streaming proxy of the second computing device;
receiving at the first computing device, the first block from the second computing device;
decrypting, from the network encryption, the first block using the encryption and decryption module of the first computing device;
sending the decrypted first block to the trusted media player of the first computing device;
repeating processing of subsequent blocks of the media file until the entire media file has been rendered on the trusted media player of the first computing device.

2. The method of claim 1, further comprising:
decrypting, from the non-network encryption, a second block of the media stream with an encryption and decryption module of a media streaming apparatus on a third computing device connected by the private network, the media streaming apparatus comprising: a controller; the encryption and decryption module; a media streaming proxy; and a trusted media player, wherein the encryption and decryption module in each media streaming apparatus is the same and the media streaming proxy in each media streaming apparatus is the same;
encrypting, with the network encryption, the second block of the media stream with the encryption and decryption module on the third computing device;
receiving, at the first computing device, the second block from the third computing device;
decrypting, from the network encryption, the second block using the encryption and decryption module on the first computing device; and
sending the decrypted second block to the trusted media player of the first computing device.

3. The method of claim 2, wherein the second computing device and the third computing devices are different types of devices.

4. The method of claim 3, wherein the second computing device is a personal computer and the third computing device is a handheld device.

5. The method of claim 1, wherein the first computing device further comprises a network address mapping table located in a memory of the first computing device.

6. The method of claim 1, wherein the second computing device further comprises a network address mapping table located in a memory of the second computing device.

7. The method of claim 1, wherein the private network is a home-based network.

8. The method of claim 1, wherein the private network does not include a server.

9. The method of claim 1, wherein the private network is a WiFi network.

10. The method of claim 1, wherein the private network uses different encryption keys to communicate different content within the private network.

11. A method of offloading processing from a displaying device using other devices connected by a local, private network, the method comprising:
    operating media streaming apparatuses on first, second, and third computing devices connected by the local, private network, wherein the media streaming apparatuses each comprise: a controller; an encryption and decryption module; and a media streaming proxy, and wherein the encryption and decryption module in each media streaming apparatus is the same and the media streaming proxy in each media streaming apparatus is the same;
    requesting a media stream, in response to user input to the first computing device, using the media streaming apparatus on the first computing device, wherein the first computing device lacks available memory sufficient to store the entire requested media stream;
    receiving at the first computing device, a first portion of the requested media stream from the second computing device, the second computing device having received the first portion of the media stream from a gateway connected to the local, private network;
    decrypting, from a network encryption, the first portion of the media stream on the first computing device;
    receiving at the first computing device, a second portion of the media stream from the third computing device, the third computing device having received the second portion of the media stream from the gateway connected to the local, private network;
    decrypting, from the network encryption, the second portion of the media stream on the first network device;
    maintaining a network address mapping table containing locations of portions of the media stream that have been received by the second and third computing devices;
    consulting the network address mapping table to locate the first and second portions of the media stream;
    requesting portions of the stream from a computing device based on network addresses identified in the network address mapping table;
    providing the decrypted portions of the media stream to a trusted media player on the first computing device; and
    repeating processing portions of the media stream until the entire media stream has been rendered on the first computing device.

12. The method of claim 11, wherein the request for the media stream by the media streaming apparatus on the first computing device is transmitted via the gateway to a processor not on the local, private network.

13. The method of claim 11, wherein the request is a Hyper Text Transfer Protocol (HTTP) request.

14. The method of claim 11, wherein the media streaming apparatus on the first computing device accesses the network address mapping table to request portions of the media stream from the second and third computing device as memory becomes available on the first computing device.

15. The method of claim 11, wherein the network address mapping table is stored on the first computing device.

16. The method of claim 11, wherein the local, private network does not include a server.

17. The method of claim 11, wherein the local, private network encrypts different communication within the local, private network using different encryption keys.

18. A method of enhancing performance of displayed media on a computing device with limited processing power, the method comprising:
    on a first computing device running an instance of a media streaming apparatus, requesting a media stream via a gateway on a local, private network, wherein the first computing device lacks the processing power to process the media stream while displaying the media stream without degrading display of the media stream and wherein the media streaming apparatus comprises: a controller, an encryption and decryption module, and a media streaming proxy;
    requesting portions of the media stream from multiple computing devices connected to the local network, each of the multiple devices running an instance of a media streaming apparatus, wherein locations of the requested portions of the media stream are stored in a network address mapping table, the requested portions are requested based on available resources on the first computing device, the encryption and decryption module in each media streaming apparatus is the same, and the media streaming proxy in each media streaming apparatus is the same;
    sending only encrypted portions of the media stream between computing devices;
    storing portions of the media stream on the different computing devices until the portions are requested by the first computing device and provided to the first computing device; and
    displaying the media stream on the first computing device using a local trusted media player.

19. The method of claim 18, wherein the multiple computing devices comprise different types of computing devices.

20. The method of claim 18, wherein the local, private network uses multiple encryption domains.

* * * * *